United States Patent [19]

Tsutsumi et al.

[11] Patent Number: 5,074,779
[45] Date of Patent: Dec. 24, 1991

[54] MOLD FOR RESIN-SEALING A SEMICONDUCTOR DEVICE

[75] Inventors: Yasutsugu Tsutsumi; Sueyoshi Tanaka, both of Fukuoka, Japan

[73] Assignee: Mitsubishi Denki Kabushiki Kaisha, Japan

[21] Appl. No.: 612,628

[22] Filed: Nov. 14, 1990

[30] Foreign Application Priority Data

Jan. 23, 1990 [JP] Japan ................................. 2-11931

[51] Int. Cl.⁵ ............................................. B29C 45/42
[52] U.S. Cl. ..................................... 425/444; 249/67; 425/556
[58] Field of Search ............... 425/556, 554, 444, 422, 425/351, 111, 129.1; 249/67, 68

[56] References Cited

U.S. PATENT DOCUMENTS

| | | | |
|---|---|---|---|
| 3,645,492 | 2/1972 | Edlis | 425/556 X |
| 4,645,446 | 2/1987 | Hehl | 425/444 X |
| 4,687,434 | 8/1987 | Beglinger | 249/68 X |
| 4,874,308 | 10/1989 | Atlas et al. | 425/129.1 X |
| 5,009,587 | 4/1991 | Corvaglia et al. | 425/556 X |

FOREIGN PATENT DOCUMENTS 62-269328 11/1987 Japan ................................. 425/556

*Primary Examiner*—Richard L. Chiesa
*Attorney, Agent, or Firm*—Leydig, Voit & Mayer

[57] ABSTRACT

A mold for resin-sealing of a semiconductor device includes a molding board, a cavity retainer which is secured to the molding board forming a void facing the molding board, a plurality of cavity inserts, each of which is embedded in the cavity retainer so that the face thereof is exposed, each cavity insert having a cavity formed in the face, a plurality of ejecting pins arranged to travel freely and penetrating each cavity insert and the cavity retainer, one end of the ejecting pin protruding into the inside of the void of the cavity retainer, the other end of each ejecting pin protruding into the inside of the cavity of the cavity insert, an ejector plate to which one end of each ejecting pin is secured, the ejector plate being positioned in the void of the cavity retainer, and elastic pins which penetrate through the ejector plate to elastically support the cavity inserts on the molding board.

5 Claims, 3 Drawing Sheets

MOLD FOR RESIN-SEALING A SEMICONDUCTOR DEVICE

BACKGROUND OF THE INVENTION

1. Field of the Invention

The present invention relates to a mold for resin-sealing of a semiconductor device.

2. Description of the Related Art

FIG. 4 is a cross-sectional view illustrating the lower mold half of a conventional resin-sealing apparatus disclosed in Japanese Published Patent Application 62-269328. A cavity 1b is formed in a molding board 1, and a cavity block 2 is incorporated into the cavity 1b. A plurality of cavities 2a are formed on the upper face of the cavity block 2, and a plurality of penetrating apertures 2c connecting the cavities 2a and the lower face of the cavity block 2 are formed. An ejecting pin 3 is inserted into each of the penetrating apertures 2c so as to freely travel, the lower end of each of the ejecting pins 3 being secured by means of a pressure plate 5 to the upper part of an ejector plate 4. The upper end of an ejecting rod 8 contacts the lower face of the ejector plate 4, and the ejecting rod 8 penetrates through the molding board 1 so as to extend downward. Further, a pot 7 for containing resin is formed in the central part of the cavity block 2, whereas the front end of a plunger 6 is inserted into the pot 7. Furthermore, heaters 1a and 2b are respectively buried in the molding board 1 and the cavity block 2.

An ejector block, composed of the cavity block 2, the ejecting pins 3, the ejector plate 4, and the pressure plate 5, is removably incorporated into the molding board 1 as an integral part, and is replaceable according to the kind of lead frames and semiconductor chips to be resin-sealed. FIG. 4 shows the lower mold half which is utilized together with an upper mold half having substantially the same structure as that of the lower mold half.

When resin-sealing is performed, a lead frame (not shown) is held on a parting plane 50 of the lower mold half so that a semiconductor chip (not shown) is contained in the cavity 2a, and at the same time resin (not shown) is introduced into the pot 7. Under these conditions, a press apparatus (not shown) clamps the lower mold half and the upper mold half (not shown). The resin in the pot 7 is then pressed by driving the plunger 6 upward and is introduced into the cavities 2a through a runner and gates formed in the upper mold half.

After the resin has set up, the upper mold half is separated from the lower mold half, and the ejector plate 4 is lifted upward by the ejecting rod 8. This causes the top end of each of the ejecting pins 3 to protrude into the inside of one of the cavities 2a, and the lead frames which have been resin-sealed are taken out of the cavities 2a.

Because of the structure through which the cavity block 2 is incorporated into the upper part of the cavity 1b that is formed in the molding board 1, the stiffness of the molding board 1 at the periphery of the parting plane 50 greatly differs from that of the cavity block 2 at the center of the parting plane 50. For this reason, when a clamping force acts on the lead frame as a result of clamping the upper and lower mold halves, the parting plane 50 is deformed, as illustrated in FIG. 5, and it is therefore impossible to press the lead frame evenly. Consequently, this leads to a problem in that flashing is formed on the surface of the lead frame in accordance with the amount B of deformation of the parting plane 50.

SUMMARY OF THE INVENTION

Accordingly, it is an object of the invention to provide a mold for resin-sealing of a semiconductor device which evenly presses a lead frame, and which resin-seals the semiconductor device without flashing being formed on the surface of the lead frame.

The present invention provides a mold for resin-sealing of a semiconductor device, comprising a molding board, a cavity retainer which is secured to the molding board to form a void facing to the molding board, a plurality of cavity inserts, each of which is embedded in the cavity retainer so that the face thereof is exposed, each cavity insert having a cavity formed in the face, a plurality of ejecting pins arranged to travel freely so that each ejecting pin penetrates through the cavity insert and the cavity retainer, one end of the ejecting pin protruding into the inside of the void of the cavity retainer, the other end of the ejecting pin protruding into the inside of the cavity of the cavity insert, an ejector plate to which one end of each ejecting pin is secured, the ejector plate being positioned in the void of the cavity retainer, and first elastic means which penetrates through the ejector plate to elastically support the cavity inserts over the molding board.

The above and other objects, features and advantages of the invention will become clear from the following description of the preferred embodiments thereof, taken in conjunction with the accompanying drawings.

DESCRIPTION OF THE PREFERRED EMBODIMENTS

Embodiments of the present invention will be hereinafter described with reference to the accompanying drawings.

Figure 1:
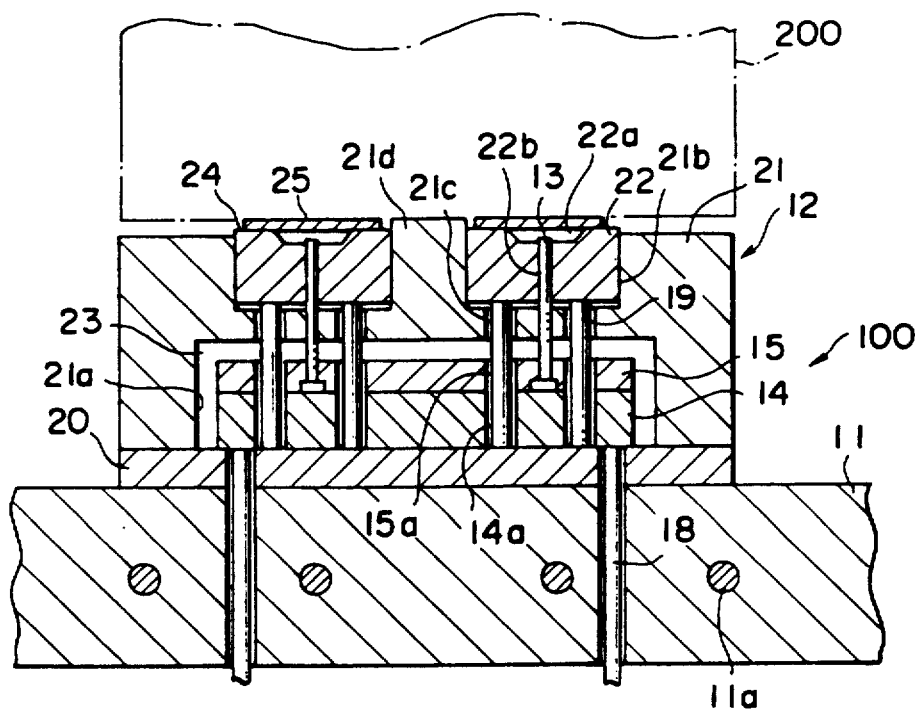
FIG. 1 is a cross-sectional view illustrating an embodiment of a mold for resin-sealing of a semiconductor device according to the present invention.

As illustrated in FIG. 1, a lower mold half 100 of a resin-sealing apparatus according to an embodiment of the present invention includes cavity block 12 and a molding board 11 through and intermediate backing plate 20. The cavity block 12 includes a cavity retainer 21 secured to the backing plate 20 and a plurality of cavity inserts 22 buried in the upper face of the cavity retainer 21.

The cavity retainer 21 has a cavity 21a which opens downward, and which defines a void 23 between the cavity retainer 21 and the backing plate 20. An ejector plate 14 and a pressure plate 15 are provided in the void 23. A plurality of cavities 21b are formed in the upper face of the cavity retainer 21, and the cavity inserts 22 are slidably inserted into the respective cavities 21b. The upper face of each of the cavity inserts 22 is exposed as a parting plane 24, in which a cavity 22a is formed. A penetrating aperture 22b connecting the cavity 22a and the lower face of the cavity insert 22 is formed in each of the cavity inserts 22, and an ejecting pin 13 is inserted into each of the penetrating apertures 22b so as to travel freely. The lower end of each of the ejecting pins 13 penetrates through the cavity retainer 21 to the void 23, and is fixed to the ejector plate 14 by means of the pressure plate 15. The upper parts of ejecting rods 18 contact the lower face of the ejector plate 14, and the ejecting rods 18 penetrate through the backing plate 20 and the molding board 11 and extend downward.

A plurality of penetrating apertures 21c connecting cavities 21b and the void 23 are formed in the cavity retainer 21, whereas penetrating apertures 14a and 15a in the ejector plate 14 and the pressure plate 15 are respectively formed in positions corresponding to the penetrating aperture 21c of the cavity retainer 21. Elastic pins 19 included in first elastic means, are inserted into the penetrating apertures 14a, 15a, 21c, each of which corresponds to another. One end of each of the elastic pins 19 contacts the lower face of the cavity insert 22, whereas the other end of each of the elastic pins 19 contacts the upper face of the backing plate 20. Various elastic materials, such as steel, particularly steels used in making dies and high speed cutting tools, are used as materials for the elastic pins 19.

Figure 4:
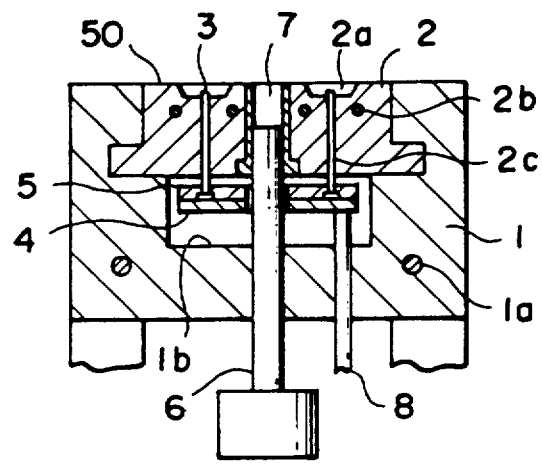
FIG. 4 is a conventional cross-sectional view showing a mold for resin-sealing of a semiconductor device and FIG. 5 is a cross-sectional view showing the conventional mold when it is pressed.
Figure 5:
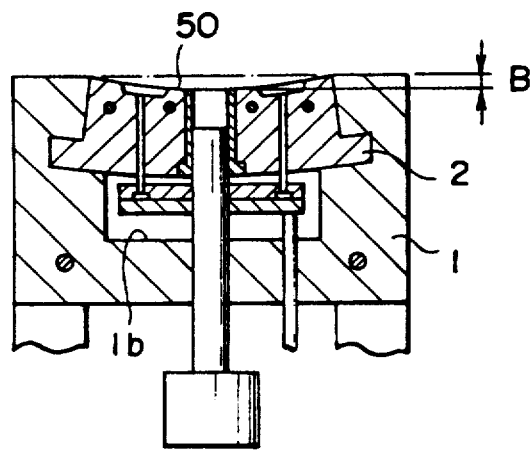

Further, heaters 11a are embedded in the molding board 11. Though not shown, a pot for introducing resin is formed in the cavity retainer 21, and a plunger is provided for pressing the resin in the pot. Moreover, an upper mold half 200 of a conventional structure as illustrated in FIG. 4 opposes the lower mold half 100, and the upper mold half 200 and the lower mold half 100 are employed as a pair.

The operation will now be described for an embodiment where a lead frame to which a semiconductor chip is installed is resin-sealed. The lead frame 25 is held on the parting plane 24 of the lower mold half 100 so that a semiconductor chip (not shown) is contained in a cavity 22a of a cavity insert 22, and at the same time resin is introduced into the pot (not shown). Under these conditions, a press apparatus (not shown) clamps the lower mold half 100 and the upper mold half 200. The lead frame 25 is pressed by the upper mold half 200 and the lower mold half 100 while being sandwiched between them. At this time, the elastic pins 19 are compressed and deformed in accordance with the pressure applied, and in FIG. 1, the cavity inserts 22 shift slightly downward with respect to the cavity retainer 21. Accordingly, even if the parting plane of the conventionally constructed upper mold half 200 is deformed by the applied pressure, each of the cavity inserts 22 shifts in accordance with the deformation, thereby evenly pressing the lead frame 25.

Under these conditions, the resin in the pot is pressed by the plunger (not shown), and is introduced into the cavities 22a through a runner and gates formed in the upper mold half 200. At this time, since the lead frame 25 is evenly pressed, the resin does not overflow from the cavity 22a, thereby preventing flashing from forming.

After the resin is set up, the upper mold half 200 has separated from the lower mold half 100, and the ejector plate 14 is lifted upward by using the ejecting rods 18. This causes the upper end of each of the ejecting pins 13 to protrude into the inside of the cavity 22a, and the lead frame which has been resin-sealed is taken out of the cavities 22a.

As shown in FIG. 1, the elastic pins 19 are arranged so as to penetrate through the ejector plate 14 and the pressure plate 15 in the void 23, and support the cavity inserts 22 above the backing plate 20. For this reason, the length of the elastic pins 19 is made longer than the distance between the top surface of the backing plate 20 and the bottom surfaces of cavities 21b as well as longer than the elastic pine supporting cavity inserts as discussed below with reference to FIG. 3. The elastic pins 19 are so designed as to increase the amount of their elasticity when pressed. Therefore, a reaction force caused by the elastic pins 19 is generated without fail with respect to the pressure applied to the lead frame 25, thereby evenly pressing the lead frame 25.

It is desirable that when pressed the length of the elastic pins 19 be set to a length so that the upper face of the lead frame 25 is substantially as high as the upper face of the central portion 21d of the cavity retainer 21.

In this embodiment, because a plurality of cavity inserts 22 are independently supported by the elastic pins 19, pressure and thermal deformation can be absorbed, and variations in the thicknesses of the lead frames 25 can also be absorbed by the cavity inserts 22.

Further, since the periphery of the cavity retainer 21 is connected to the molding board 11 via the backing plate 20, heat from the heaters 11a is efficiently conducted, through the molding board 11, the backing plate 20 and the cavity retainer 21, to the cavity inserts 22. For this reason, when a thermosetting resin, such as an epoxy, is utilized, it is easy for the resin inside the cavity 22a to set up.

Figure 2:
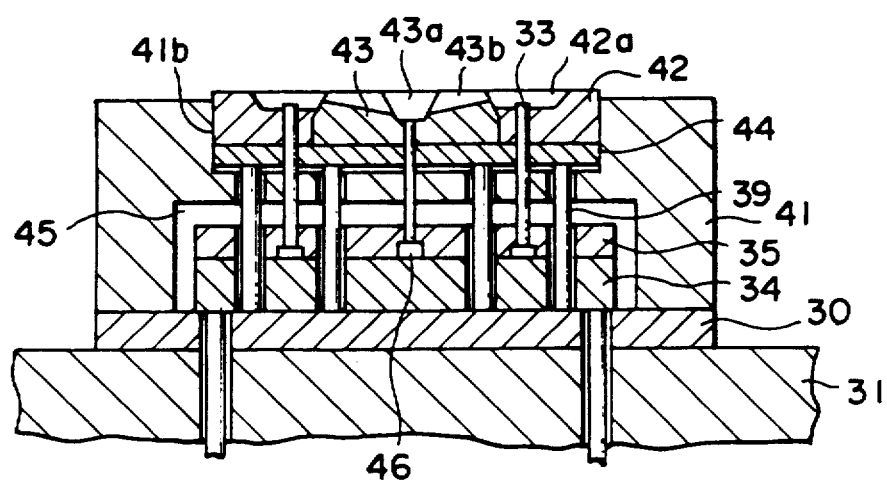
FIG. 2 and 3 are cross-sectional views illustrating other embodiments of a mold for resin-sealing of the semiconductor device according to the invention.

FIG. 2 is a cross-sectional view illustrating an upper mold half to which the present invention is applied. As is the same with the lower mold half shown in FIG. 1, a cavity retainer 41 is disposed on a molding board 31 through a backing plate 30. A cavity 41b, in which a connecting plate 44 is held, is formed in the cavity retainer 41. A runner insert 43 and a plurality of cavity inserts 42 are arranged on the connecting plate 44. The cavity inserts 42 each have a cavity 42a. The runner insert 43 abuts the cavity inserts 42, and has a runner 43a and a plurality of gates 43b connecting to the runner 43a. The gates 43b are respectively connected to the cavities 42a of the cavity inserts 42.

In each of the cavity inserts 42, one end of each of ejecting pins 33 faces the cavity 42a, whereas the other end of each of the ejecting pins 33 penetrates through the connecting plate 44 and the cavity retainer 41 to a void 45 which is formed between the cavity retainer 41 and the backing plate 30, and is fixed to an ejector plate 34 by means of a pressure plate 35. In the runner insert 43, an ejecting pin 46 is provided so as to travel freely, one end of which faces the runner 43a, the other end of which penetrates through the connecting plate 44 and the cavity retainer 41 in order to be secured to the ejector plate 34. The ejecting pin 46 removes resin remaining in the runner 43a after the resin has set up.

Furthermore, a plurality of elastic pins 39, penetrating the cavity retainer 41, the pressure plate 35, and the ejector plate 34, are provided. That is, the cavity insert 42 and the runner insert 43 are supported above the molding board 31 by the elastic pins 39 which are disposed across the connecting plate 44 and the backing plate 30.

When such an upper mold half is employed by causing it to oppose the conventionally constructed lower mold half shown in FIG. 4, because the connecting plate 44 is supported by the elastic pins 39, it is deformed in accordance with the deformation of the parting plane of the lower mold half, even when the parting plane is deformed while being pressed. For this reason, the cavity inserts 42 and the runner insert 43 arranged on the connecting plate 44 move slightly. This permits the lead frame sandwiched between the upper and lower mold halves to be evenly pressed.

Figure 3:
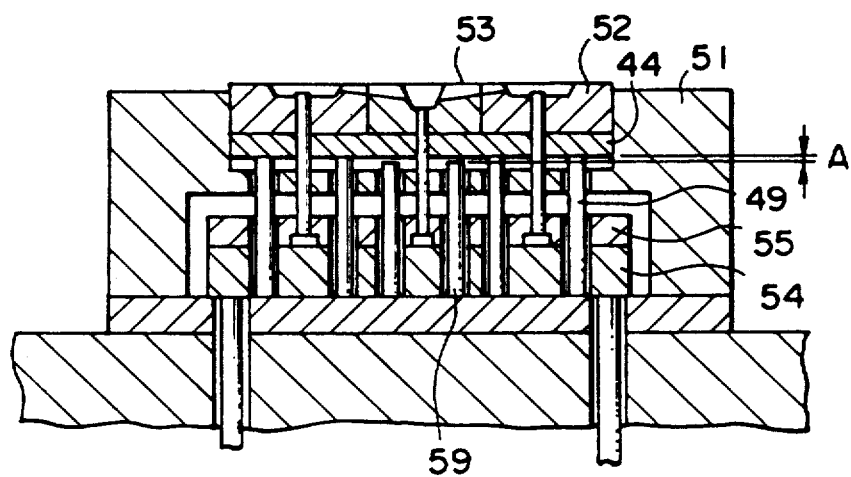

As illustrated in FIG. 3, first elastic pins 49 for supporting a cavity insert 52 and second elastic pins 59 for supporting a runner insert 53 are separately provided so as to penetrate through a cavity retainer 51, a pressure plate 55, and an ejector plate 54, respectively. In this case, it is desirable that the length of the second elastic pins 59 be made shorter than that of the first elastic pins 49 by a predetermined length A. This allows the cavity insert 52 to be pressed more tightly, and makes it possible to evenly press the lead frame.

The connecting surfaces of the cavity insert and the runner insert may be tapered as shown in FIG. 2, or planar as illustrated in FIG. 3.

Moreover, the upper and lower mold halves to which the present invention is applied may be combined for use. For example, the upper mold half illustrated in FIG. 2 or FIG. 3 can be utilized as the corresponding part for the lower mold half in FIG. 1.

The above has been offered for illustrative purposes only, and is not intended to limit the scope of the invention of this application, which is as defined in the claims below.

What is claimed is:

1. A mold for resin-sealing of a semiconductor device comprising:
    a molding board;
    a cavity retainer secured to said molding board including a void facing said molding board;
    a plurality of cavity inserts, each having a face and embedded in said cavity retainer so that the respective faces are exposed, each cavity insert including a cavity in said face;
    a plurality of freely sliding ejecting pins having opposed first and second ends and penetrating said cavity insert and said cavity retainer, the first end of each of said ejecting pins protruding into the void of said cavity retainer, the second end protruding into a said cavity of a respective said cavity insert;
    an ejector plate to which the first end of each said ejecting pin is secured, the ejector plate being positioned in the void of said cavity retainer; and
    first elastic means penetrating said ejector plate to elastically support said cavity inserts on said molding board.

2. A mold according to claim 1 wherein each of said cavity inserts is independently supported by said first elastic means.

3. A mold according to claim 1 comprising a runner insert including a runner and plurality of gates embedded in said cavity retainer abutting said cavity inserts, said runner and gates being fluidly connected to the cavities of said cavity inserts, and a connecting plate which connects said cavity inserts and said runner insert, said connecting plate being supported by said first elastic means.

4. A mold according to claim 3 comprising second elastic means penetrating said ejector plate for elastically supporting said runner insert on said molding board, said second elastic means having a shorter length than that of said first elastic means.

5. A mold according to claim 1 comprising a backing plate interposed between said molding board and said cavity retainer.

* * * * *